(12) United States Patent
Sharpe et al.

(10) Patent No.: US 12,254,502 B2
(45) Date of Patent: Mar. 18, 2025

(54) DATA SHARING AMONG OPEN BROWSER TABS

(71) Applicant: Capital One Services, LLC, McLean, VA (US)

(72) Inventors: Samuel Sharpe, Cambridge, MA (US); Kenny Bean, Herndon, VA (US); Jeremy Goodsitt, Champaign, IL (US); Austin Walters, Savoy, IL (US); Brian Barr, Schenectady, NY (US); Galen Rafferty, Mahomet, IL (US)

(73) Assignee: Capital One Services, LLC, McLean, VA (US)

( * ) Notice: Subject to any disclaimer, the term of this patent is extended or adjusted under 35 U.S.C. 154(b) by 260 days.

(21) Appl. No.: 17/981,983

(22) Filed: Nov. 7, 2022

(65) Prior Publication Data

US 2024/0152987 A1 May 9, 2024

(51) Int. Cl.
*G06F 16/00* (2019.01)
*G06F 16/954* (2019.01)
*G06Q 30/0601* (2023.01)
*H04L 67/02* (2022.01)

(52) U.S. Cl.
CPC ....... *G06Q 30/0629* (2013.01); *G06F 16/954* (2019.01); *G06Q 30/0643* (2013.01); *H04L 67/02* (2013.01)

(58) Field of Classification Search
CPC .......... G06Q 30/0643; G06Q 30/0629; G06Q 30/0641; G06Q 30/0613; G06Q 30/08; G06Q 50/01; G06F 16/954; H04L 67/02
See application file for complete search history.

(56) References Cited

U.S. PATENT DOCUMENTS

| | | | |
|---|---|---|---|
| 10,554,697 B1 * | 2/2020 | Ledet | H04L 65/4015 |
| 11,048,855 B2 * | 6/2021 | Liu | G06F 16/335 |
| 11,329,861 B2 | 5/2022 | Busbee et al. | |
| 11,379,490 B2 | 7/2022 | Zimmerman | |
| 11,385,775 B2 | 7/2022 | Singh et al. | |
| 2015/0264156 A1 * | 9/2015 | De Alwis | G06F 16/958 |
| | | | 709/203 |
| 2015/0334182 A1 * | 11/2015 | Wu | H04L 67/02 |
| | | | 707/620 |
| 2016/0125491 A1 * | 5/2016 | Zellner | G06Q 30/0613 |
| | | | 705/26.41 |
| 2017/0116339 A1 * | 4/2017 | Stein | G06F 16/24578 |
| 2017/0300177 A1 * | 10/2017 | Blazek | G06F 16/954 |

* cited by examiner

*Primary Examiner* — Yicun Wu
(74) *Attorney, Agent, or Firm* — Banner & Witcoff, Ltd.

(57) ABSTRACT

Systems as described herein may include detecting live browser information that a user navigates to a first website displayed in a first open browser tab and a second website displayed in a second open browser tab. A data sharing server may provide the live browser information to a machine learning model as input. Based on feedback from the machine learning model, one or more similar products displayed in the first website and the second website may be determined. The data sharing server may detect an update on the one or more similar products, and cause a user device to display an alert indicating the update on the similar products.

20 Claims, 7 Drawing Sheets

DATA SHARING AMONG OPEN BROWSER TABS

FIELD OF USE

Aspects of the disclosure relate generally to big data and more specifically to the processing and management of shared data among browser tabs.

BACKGROUND

A remote server in a computing network may process data, including user browser data generated from user devices, to facilitate decision-making process. For example, a user may interact with a browser or a browser extension installed on a user device to access information on certain websites related to an interactive entity (e.g., a merchant) providing a service or a product. However, a conventional server may use historical browser data after the fact to determine that the user completed a purchase. If the user terminates the browser window without making a purchase, the conventional server may fail to capture the browser data. As a result, the conventional server might not take advantage of the live browser data in open browser tabs to gauge the user's interest and thereby limit its ability to process live browser data and offer insights to support the decision-making process.

Aspects described herein may address these and other problems, and generally improve the quality, efficiency, and speed of processing shared data among open browser tabs to offer insights into the details of the live user data.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Systems as described herein may include features for sharing data among open browser tabs. A user may open a plurality of browser tabs on a user device. An electronic data sharing system may use a browser extension to monitor live browser information as user performs various operations in these open browser tabs. For example, the electronic data sharing system may detect that a user navigates to a first website displayed via a first open browser tab and a second website displayed via a second open browser tab. The system may receive the live browser information associated with the open browser tabs from the browser extension. The system may provide the live browser information as input to a first machine learning model. Based on feedback from the first machine learning model, the system may determine one or more similar products displayed in the first website and the second website. The system may detect an update on the determined one or more similar products associated with the first website in the first open browser tab. For example, the update on the first website may include a price or inventory change, a removal of an existing listing associated with the determined one or more similar products from the first website, or a posting of a new listing associated with the determined one or more similar products on the first website. Accordingly, the system may cause the user device to display an alert indicating the update on the determined one or more similar products. For example, the update on the products may be displayed in an overlay window or in the first website via the first open browser tab.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects described herein may relate to browser data shared among open browser tabs. An electronic data sharing system may detect that a user navigates to a first website displayed via a first open browser tab and a second website displayed via a second open browser tab. The user may switch back and forth between the open browser tabs. The system may receive live browser information associated with the open browser tabs from a browser extension installed on a user device. The system may provide the live browser information as input to a first machine learning model. Based on feedback from the first machine learning model, the system may determine one or more similar products displayed in the first website and the second website. The system may detect an update on the determined one or more similar products associated with the first website in the first open browser tab. The system may cause the user device to display an alert indicating the update on the determined one or more similar products.

In many aspects, after determining the one or more similar products displayed in the first website and the second website, the electronic data sharing system may detect that the user navigates away from the first website without making a purchase. The system may send price information associated with the determined one or more similar products displayed in the first website to an interaction entity (e.g., a merchant or a service provider) computing device.

In many aspects, the first machine learning model may be trained to recognize product similarity based on training data. The training data may include, for example, image embeddings from a plurality of training interaction entity websites, text embeddings from the plurality of training interaction entity websites, or pre-labeled similar products from the plurality of training interaction entity websites. Based on the live browser information, the system may receive one or more similar products displayed in the first and second websites as output from the trained first machine learning model.

In many aspects, the system may use a second machine learning model to determine whether the first website and the second website are interaction entity websites based on second training data. For example, the second training data may include information on logos, images, repetitive text, a number of images on a particular website, or a layout of the particular website that has characteristics of the interaction entity websites.

In many aspects, the electronic data sharing system may use a third machine learning model to determine a suggested bid price range (e.g., a 10% price reduction), which may have the advantage of inducing the user to purchase the determined one or more similar products. The system may present the suggested bid price range to an interaction entity computing device. The third machine learning model may be trained based on training data such as a price of a training product, a product category, an interaction entity category, a time elapsed since the product was available on the market, a history of previous price drop offers and/or whether these offers actually induced the sale successfully. For example, the third machine learning model may be trained to determine that a 20% price drop on an older model of a vacuum cleaner may be likely to induce a sale, while a 10% price drop on a newer model of the vacuum cleaner may be likely to induce a sale.

In many aspect, the electronic data sharing system may execute a background process to periodically refresh the first website displaying the determined one or more similar products. The system may use a fourth machine learning model to determine a refresh rate to periodically refresh the first website that displays the one or more similar products. The fourth machine learning model may be trained based on training data indicating a plurality of interaction entity websites and frequencies of price changes associated with the plurality of interaction entity websites.

The electronic data sharing system may differ from conventional data processing systems at least because it captures and processes live browser information from open browser tabs. The present system is significantly more than the mere collecting of historical browser information after the user completes a transaction: rather, the present system may analyze the live browser information to gauge the user interest at a time prior to the user operation of pressing a purchase button or terminating the website or the open browser tab. The present system may determine relevant information associated with webpages based on commonality or similarity on products or services displayed via open browser tabs. The present system may use a machine learning model to determine a refresh rate to periodically refresh the websites to reduce network and bandwidth utilization.

Aspects described herein improve the functioning of computers by improving the accuracy, relevancy and performance of computer-implemented data sharing processes. The steps described herein recite improvements to computer-implemented data sharing processes, and in particular improve the accuracy and utility of live browser information among open browser tabs. This is a problem specific to computer-implemented data sharing processes, and the processes described herein could not be performed in the human mind (and/or, e.g., with pen and paper). For example, as will be described in further detail below, the processes described herein rely on the use of browser extension and browser tabs, the processing of live browser data, and the use of various machine learning models.

Before discussing these concepts in greater detail, however, several examples of a computing device that may be used in implementing and/or otherwise providing various aspects of the disclosure will first be discussed with respect to FIG. 1.

Figure 1:
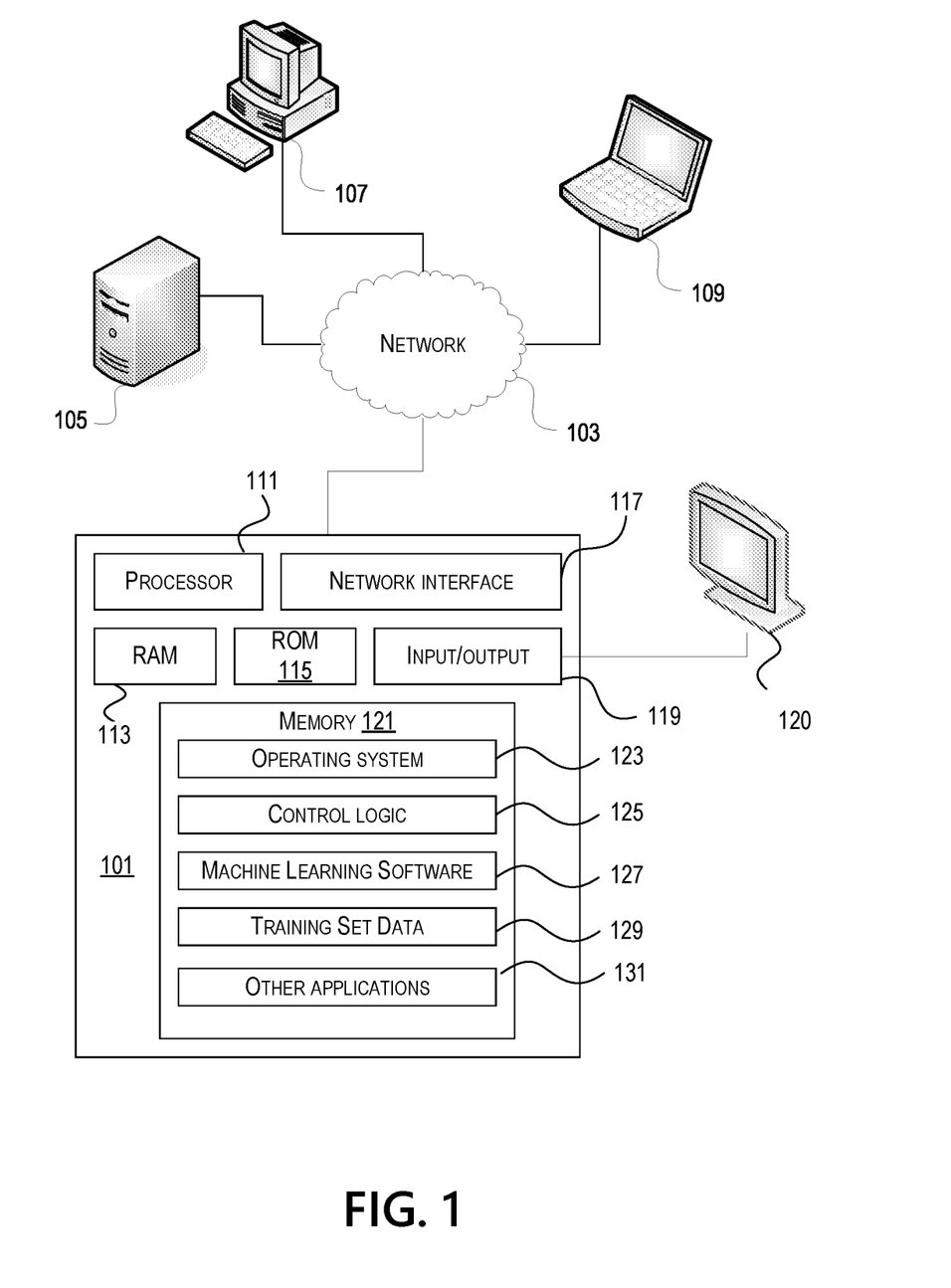
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

Figure 2:
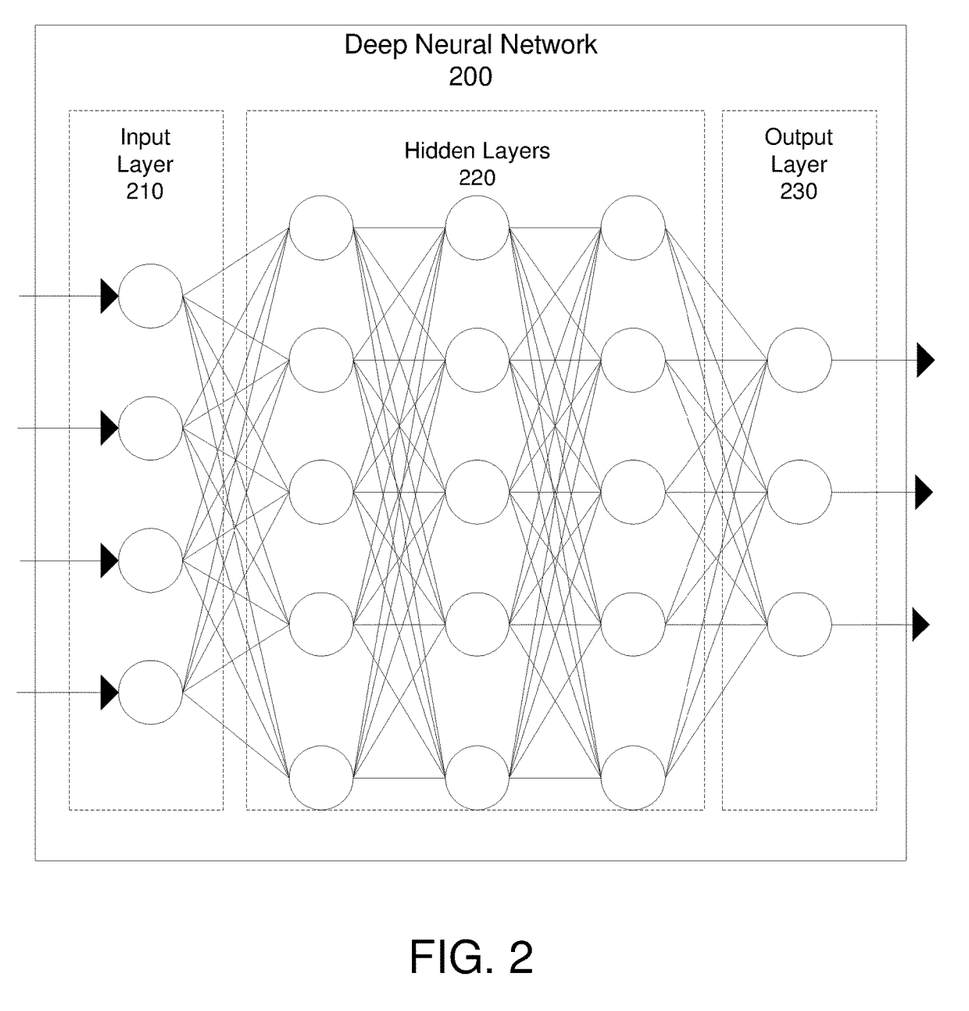
FIG. 2 depicts an example of deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
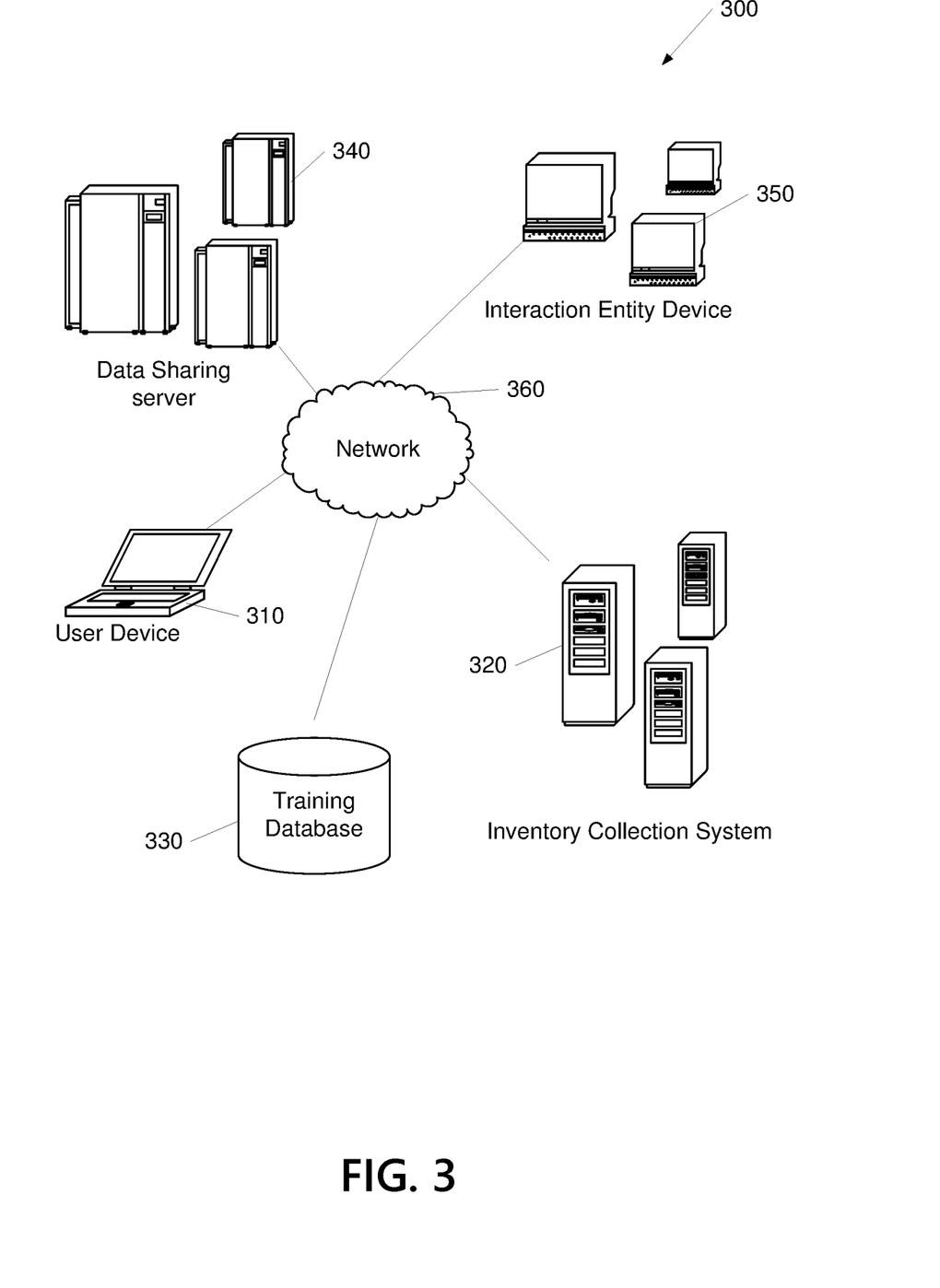
FIG. 3 shows an example of a system for sharing data among open browser tabs in which one or more aspects described herein may be implemented.

FIG. 3 depicts a system 300 for data sharing among open browser tabs. The electronic data sharing system 300 may include at least one user device 310, at least one inventory collection system 320, at least one training database 330, at least one data sharing server 340, and/or at least one interaction entity device 350 in communication via a network 360. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing systems described with respect to FIG. 1.

User devices 310 may execute a browser extension and use the browser extension to monitor user interaction in open browser tabs. User device 310 may send live browser information, and/or receive alerts on product or website update as described herein. Inventory collection system 320 may collect, parse, and/or store inventory information related to various service or products provided by interaction entities (e.g., merchant devices or service provider devices) as described herein. For example, the inventory information may include product identification, interaction entity identification, inventory availability and/or price information. Inventory collection system 320 may access public information or websites to generate an inventory list of available products and services. Alternatively and/or additionally, various interaction entities may establish a collaborative organization and share their inventory information among the members of the organization. Inventory collection system 320 may compile a master inventory list to track the products and services provided by the members of the organization.

Training database 330 may receive, store and provide training data to train different machine learning models. For example, training database 330 may store a set of training data to train a machine learning model to recognize whether a website might be associated with an interaction entity that provides a product or service. The training data may include logos, images, repetitive text, a quantity of images on a particular website and a layout of the particular website. The training data may include websites that are related to interaction entities, websites that are not related to interaction entities, and the corresponding positive or negative labels.

Training database 330 may store a set of training data to train a machine learning model to recognize whether products displayed via two or more open browser tabs are the same or similar. For example, the training data may include image embeddings or text embeddings from training websites that are associated with the interaction entities. The training data may also include pre-labeled similar products or non-similar products displayed on these training websites.

Training database 330 may store a set of training data to train a machine learning model to determine a suggested bid price range to induce a user to purchase a product or service. For example, the training data may include product information such as price information on similar products or services, merchant category codes of interaction entities.

Training database 330 may store a set of training data to train a machine learning model to determine a refresh rate to periodically refresh a website to obtain the latest update on the products or services. For example, the training data may include various training websites associated with interaction entities and frequencies of changes (e.g., a removal of an existing listing, a posting of a new listing, a product price change or inventory change) on these training websites.

Data sharing server 340 may receive live browser information from user device 310. For example, the browser extension installed on user device 310 may monitor user operations as the user opens a first website in a first open browser tab, navigates away from the website, and opens a second website in a second open browser tab. Data sharing server 340 may receive from the live browser information related to the user operations in real time from user device 310. Data sharing server 340 may cause user device 310 to display an alert to indicate the update on the products that the user browsed in the open browser tabs even when the user is not currently operating on the relevant websites. The update may include, for example, a price change, an inventory fluctuation, a removal of an existing listing, or a posting of a new listing associated with the products. Data sharing server 340 may cause an overlay window to be displayed on user device 310, and the overlay window may display the update. Alternatively and/or additionally, data sharing server 340 may display the update on the website via the open browser tab.

Data sharing server 340 may receive inventory information related to products or services provided by the interaction entities from inventory collection system 320. Based on the inventory information, data sharing server 340 may determine a product or service that the user might be interested in or a suggested bid price range for the product to induce a sale.

The training data may be retrieved from training database 330 and various machine learning models may be trained using the training data. The machine learning models may be used for different purposes. For example, the training data may be used to train a machine model to recognize whether a website might be associated with an interaction entity that provides a product or service. The training data may include websites that are associated with the interaction entities or websites that are not associated with the interaction entities. If the user navigates to the website associated with the interaction entity in an open browser tab, data sharing server 340 may trigger the browser extension to monitor user interactions with the website and collect live browser information. The live browser information may indicate that the user browses the websites associated with the interaction entities in the open browser tabs, and the user may interact with various products or services displayed on these websites.

The training data may be used to train a machine model to recognize product similarity displayed on the websites via different open browser tabs. The training data may include pre-labeled products from the training websites that are similar and pre-labeled products from the training websites that are not similar. Data sharing server 340 may provide the live browser information as input to the trained machine learning model. Based on the feedback from the trained machine learning model, data sharing server 340 may determine one or more similar products displayed in the websites via the open browser tabs.

Data sharing server 340 may execute a background process to periodically refresh the websites displaying the determined similar products. The training data may be retrieved from database 330 to train a machine learning model to determine an optimal refresh rate associated with the website. When an update on one of the determined similar products is detected, data sharing server 340 may cause user device 310 to display an alert. For example, the alert may notify the user there is a price drop on a product, an out of stock product becomes available, or a similar product is available on an alternative website. The alert may be generated while the user navigates away from one or more websites in the open browser tabs without making a purchase. The alert may be generated just before the user navigates away from one or more websites in the open browser tabs. A machine learning model may be trained to determine certain cursor movement to present the alert based on historical cursor movement that led to a purchase. As the user navigates in a website, the user's cursor movement may follow a certain path to make a purchase. The machine learning model may determine, for example, when the user's cursor hovers over a product for 5 seconds, this indicates a high user interest on the product. Data sharing server 340 may present the alert, rather than waiting until the user navigates away from the website (which may cause the opportunity to induce a sale to be lost). The machine learning model may determine, for example, when the user's cursor hovers over a product for 2 seconds. This may not trigger the data sharing server to present the alert, given that frequent alerts may disrupt user experience and cause the user to prematurely abandon the website. The alert may also be generated after the user navigates away from one or more websites without making a purchase, but the user may still leave open the browser tabs that host the websites displaying the products. In these situations, the alert may be generated at a time when the user's interest at the relevant products may be particularly high, or when the user has sustained interest at the relevant products, rather than after the fact that the user actually made the purchase and the optimal opportunity to induce purchase may be lost.

Data sharing server 340 may analyze the live browser data from user device 310 and determine one or more potential reasons that may prevent the user to make the purchase. For example, the user may be concerned with the price of the product, a quality of the product, or an availability of the product. Data sharing server 340 may alert user device 310 when there is a price drop or the product becomes available. Data sharing server 340 may send the relevant information to inventory collection system 320 to find alternative product that may address the user's concerns.

Interaction entity device 350 may be a device that hosts a website that provides a product or a service to the users. Interaction entity device 350 may be a member of a collaboration organization that shares inventory information among its members. The interaction entities may share an inventory collection system 320. Data sharing server 340 may communicate with interaction entity device 350 for information on a suggested bid price range for a product. For example, the training data may be retrieved from database 330 to train a machine learning model to determine a suggested bid price range for a product that the user might be interested in. Data sharing server 340 may present the suggested bid price range to interaction entity device 350. Based on the suggested bid price range, interaction entity device 350 may send a response including a bid price to data sharing server 340. Data sharing server 340 may in turn send the bid price to user device 310.

User device 310, inventory collection system 320, training database 330, data sharing server 340, and/or interaction entity device 350 may be associated with a particular authentication session. Data sharing server 340 may receive live browser information and inventory information, process the live browser information, and/or share inventory and product information with user devices or interaction entity devices as described herein. However, it should be noted that any device in the electronic data sharing system 300 may perform any of the processes and/or store any data as described herein. Some or all of the data described herein may be stored using one or more databases. Databases may include, but are not limited to relational databases, hierarchical databases, distributed databases, in-memory databases, flat file databases, XML databases, NoSQL databases, graph databases, and/or a combination thereof. The network 140 may include a local area network (LAN), a wide area network (WAN), a wireless telecommunications network, and/or any other communication network or combination thereof.

The data transferred to and from various computing devices in electronic data sharing system 300 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in the electronic data sharing system 300 in front of one or more computing devices such that any external devices may communicate directly with the specialized hardware.

Figure 4:
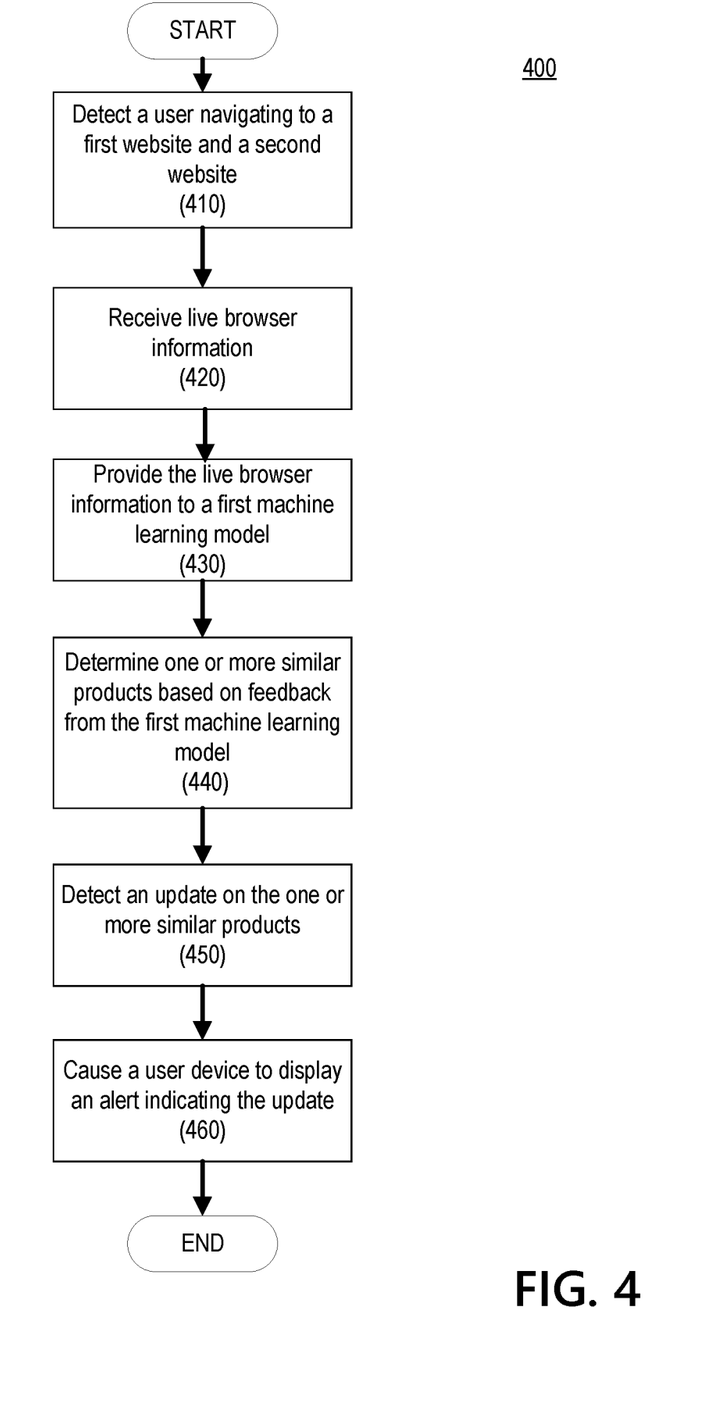
FIG. 4 shows a flow chart of a process for sharing data among open browser tabs according to one or more aspects of the disclosure.

The electronic data sharing systems may collect and process live browser data generated from open browser tabs. The user interactions with various products, services and websites as reflected in the live browser data may be processed to identify similar products. These similar products may be displayed across different websites via the open browser tabs. As such, the live browser information may be used to gauge user interest and induce a sale. FIG. 4 shows a flow chart of a process for sharing data among open browser tabs according to one or more aspects of the disclosure. Some or all of the steps of process 400 may be performed using one or more computing devices as described herein.

At step 410, a data sharing server may detect that a user navigates to a first website displayed in a first open browser tab and a second website displayed in a second open browser tab. A user device associated with the user, which may display the first open browser tab and the second open browser tab, may execute a browser extension. The data sharing server may use the browser extension to monitor the user interactions with the websites, such as in substantially real time. In some examples, the data sharing server may instruct the browser extension to monitor the user interactions in the open browser tabs after a determination that the first website and the second website are related to interaction entities that provide a product or service.

The data sharing server may use a machine learning model to determine whether the first website and the second website are interaction entity websites. The machine learning model may be trained based on training data retrieved from a training database or websites obtained from public sources. The training data may include pre-labeled training websites that are associated with the interaction entities. The training data may also include pre-labeled training websites that are not associated with the interaction entities. The training data may include information such as logos, images, or repetitive text on the training websites, a quantity of images on a particular website, or a layout of the particular website. For example, the websites associated with the interaction entities providing products or services to their customers may include the logo or image representing the interaction entity or the images of the products. The websites associated with the interaction entities may display repetitive text, such as the product description, price information, or a button to add the product to a basket. The websites associated with the interaction entities may have certain layout such as a list of the products or services, and the list may contain certain number of images of the products. The training data may include information that reflects these characteristics of the websites. The machine learning model may be trained to recognize whether the website is associated with an interaction entity. After the machine learning model is trained, the data sharing server may provide the first website and the second website from the open browser tabs as input to the trained machine learning model. The trained machine learning model may generate output indicating whether the first website in the first open browser tab and the second website in the second open browser tab are associated with the interaction entities that provide a product or service.

At step 420, data sharing server may receive, from the browser extension, the live browser information associated with the first open browser tab and the second open browser tab. After the data sharing server determines that the first website and the second website are associated with the interaction entities, the user interaction with these websites in the corresponding open browser tabs may be sent to the data sharing server. The live browser information may include information that the user navigates to the first website via the first open browser tab, browses some products displayed on the first website, or navigates away from the first website. The live browser information may include information that the user opens the second browser tab, navigates to the second website, or browses products displayed on the second website. The live browser information may be sent to the data sharing server periodically as the user navigates through several websites. The live browser information may be sent to the data sharing server as the user navigates away from the first website. The live browser information may be sent to the data sharing server in batches to reduce network and bandwidth utilization.

The live browser information may include product information that the user browses in the first website and the second website. For example, the user may view a description of a first vacuum cleaner displayed on the first website.

The live browser information may include the image of the first vacuum cleaner, the product description, the price information, the make and the model of the first vacuum cleaner, or the interaction entity that procures the first vacuum cleaner. The user may navigate away from the first website, open the second browser tab, or navigate to the second website. The user may browse a description of a second vacuum cleaner displayed on the second website. The live browser information may include the image of the second vacuum cleaner, the product description, the price information, the make and the model of the second vacuum cleaner, or the interaction entity that procures the second vacuum cleaner. The first vacuum cleaner and the second vacuum cleaner may be the same or different. The live browser information may include a plurality of products that the user browses via multiple open browser tabs.

The data sharing server may receive the live browser information as unstructured data format, such as text format and converted into a common format, such as a JSON format or an XML format. The data sharing server may receive and process the live browser information in a data stream on the fly. The data sharing server may receive and process the live browser information in batch manner. For example, the live browser information may be received periodically, such as once per 10 minutes, once per minute or once per 10 seconds. The live browser information in the text format may be pre-processed, perform a random sampling to take chunks of text to look for similarities among different batches to eliminate duplicated data. Live browser information may be generated after a verification of non-duplicated data to produce a light weight data payload. In some examples, data sharing server may use natural language processing (NPL) or optical character recognition (OCR) to parse the live browser information such as description of the products displayed on the first website and second website to identify the keywords. Data sharing server may remove certain stop words that do not add much meaning to the description, such as at, the, is, which, etc.

At step 430, the live browser information may be provided as input to a machine learning model. The machine learning model may be the same or different from the machine learning model used at step 420. Data sharing server may convert the live browser information from the first data format to a second data format, and the second data format may include text embeddings or image embeddings, which may be generated based on the live browser information. For example, data sharing server may use an autoencoder such as a variational autoencoder (VAE) to convert the descriptions. An autoencoder may be a type of artificial neural network used to learn efficient data codings in an unsupervised manner. The autoencoder may learn a representation (e.g. encoding) for a set of data for the purpose of dimensionality reduction by training the network to ignore signal "noise". The autoencoder may have a reconstructing side, where the autoencoder may generate, from the reduced encoding, a representation as close as possible to its original input. An embedding may be a compact representation of the original data. The data sharing server may use language modeling and feature learning techniques in NLP where key words or phrases from the collection of the descriptions may be mapped to vectors of real numbers. In the example that a description containing five sentences that describe various aspects of the product, based on the key words in the first sentence, the data sharing server may convert the first sentence into a ten-dimensional vector of features, while maintaining the features of the original data sample. Likewise, data sharing server may convert the second sentence in the description into another vector of features.

(E.g., if the live browser information contains various features of the product) data sharing server may process the live browser information to generate a record, which may include key words such as a product identifier, an image of the product, a price of the product, a color of the product, a model of the product, a make of the product, a logo of the interactive entity providing the product, a name of the interactive entity, and so on. The data sharing server may convert the record into text embeddings or image embeddings corresponding to a vector of features based on these key words. For example, the record may include a first vector of features for a first product on the first website such as Brand X vacuum cleaner, $499.99, red, A8 Absolute, cordless, Brand X US, and so on. The first vector may also include an image of the vacuum cleaner and a logo of Brand X US. The record may include a second vector of features for a second product on the second website such as Brand X vacuum cleaner, $529.99, blue, A8 Absolute, lightweight, Website Y, and so on. The second vector may also include an image of the vacuum cleaner and a logo of Website Y.

At step 440, based on feedback from the machine learning model, data sharing server may determine one or more similar products displayed in the first website and the second website. The machine learning model may be trained to recognize product similarity based on training data retrieved from the training database. The training data may be collected from training websites or retrieved from training database that are related to interaction entities providing certain products or services. The training data may include text embeddings or image embeddings from the training interaction entity websites. The training data may include pre-labeled similar products extracted from the plurality of training interaction entity websites. The training data may also include pre-labeled non-similar products extracted from the plurality of training interaction entity websites.

The data sharing server may train the machine learning model based on the pre-labeled products. During the model training process, the weights of each connection and/or node may be adjusted as the model adapts to generate more accurate predictions on a training set. The weights assigned to each connection and/or node may be referred to as the model parameters. For example, data sharing server may use a deep learning model and the model may be initialized with a first set of model parameters. The machine learning model may use the training data as input based on the first set of model parameter and determine product similarities with a first confidence level. The data sharing server may generate a second set of model parameters based on the adjustment on the first set of model parameters. The machine learning model may use the training data as input based on the second set of model parameter and determine product similarities with a second confidence level. Based on a comparison between the first confidence level and the second confidence level, data sharing server may determine a more optimal set of parameters between the first set of model parameters and the second set of model parameters. The data sharing server may go through several iterations, and the machine learning model may be tuned with a set of optimal model parameters when the confidence level reaches a predetermined threshold (e.g., 95%).

The data sharing server may use the tuned or trained machine learning model to determine product similarities on the live browser information collected from the first website and the second website. Based on the live browser information, the data sharing server may receive as output from the trained machine learning model the determined one or more similar products displayed in the first website and the second website. For example, the machine learning model may output that the first product on the first website with the corresponding first record (e.g., Brand X vacuum cleaner, $499.99, red, A8 Absolute, cordless, Brand X US) is similar to the second product on the second website with the corresponding second record (e.g., Brand X vacuum cleaner, $529.99, blue, A8 Absolute, lightweight, Website Y).

In some examples, after determining the one or more similar products displayed in the first website and the second website, data sharing server may instruct the browser extension to continue to monitor user interactions. For example, the browser extension may detect that after the user browses the first product on the first website, and the second product on the second website, the user has navigated away from the websites without making any purchase. The user may navigate back and forth between the first open browser tab and the second browser tab. The browser extension may also detect that the user navigates away from the website without closing the first open browser tab and the second open browser tab. The browser extension may send the live browser information to the data sharing server, including the relevant user operations. Based on the determination that the first product and the second product are similar, the data sharing server may determine that the user might be interested in the first product and second product displayed via the open browser tabs. The data sharing server may extract the price information related to the first product and the second product. The data sharing server may send the price information to an interaction entity device. For example, data sharing server may send the price information (e.g., $499.99 offered by Brand X US on the first website, and $529.99 offered by Website Y on the second website) for the vacuum cleaner to the interaction entity device. The interaction entity device may be a computing device associated with Brand X US or Website Y. The interaction entity device may be a computing device not associated with either of Brand X US or Website Y. The data sharing server may present the price information to the interaction entities at the time when the user is actively shopping for the vacuum cleaner and incentivize the interaction entities to take actions to induce a sale, such as incentivizing the interaction entities to drop the price. In some embodiments, data sharing server may retrieve inventory information from the invention collection system. Based on the retrieved inventory information, data sharing server may identify one or more interaction entities providing the same or similar product that the user might be interested in. The data sharing server may also present the price information to these interaction entities to incentivize them to take actions to induce a sale.

In some embodiments, data sharing server may use a machine learning model to determine a suggested bid price range to induce the user to purchase the determined one or more similar products. For example, the machine learning model may be trained based on training data including price information on information on training products such as a price of the product, a product category, an interaction entity category, a time elapsed since the product was available on the market, a history of previous price drop offers or whether these offers actually induced the sale successfully. For example, the machine learning model may be trained to determine that a 20% price drop on an older model of the vacuum cleaner may be likely to induce a sale, while a 10% price drop on a newer model of the vacuum cleaner may be likely to induce a sale. The data sharing server may provide the product information extracted from the live browser information of the first product and second product as input to the trained machine learning model. The data sharing server may provide additional product information extracted from public resources, such as a time elapsed since the product was available on the market, as input to the trained machine learning model. Based on the output of the trained machine learning model, data sharing server may determine a suggested price range to induce a sale. For example, the trained machine learning model may suggest a price drop of 15% to 20% for the corresponding models of vacuum cleaners displayed via the first open browser tab and the second open browser tab. The data sharing server may present, to the interaction entity computing device, the suggested bid price range. If the interaction entity accepts the suggested bid price range and makes an offer, for example, for a reduced price, the data sharing server may present this reduced price to the user device at a later step (e.g., step 460).

At step 450, data sharing server may detect an update on the determined one or more similar products associated with at least one of the first website and the second website. The update may include a price change or an inventory fluctuation of the first product or the second product. The update may include a removal of an existing listing or a posting of a new listing associated with the first product or the second product displayed via the first open browser tab or the second open browser tab.

Data sharing server may execute a background process to periodically (e.g., every 10 minutes, every hour or every day) refresh the first website or the second website displaying the determined one or more similar products. The data sharing data may use a machine learning model to determine a refresh rate to periodically refresh the first website or the second website that displays the one or more similar products so that the network and bandwidth utilization may be reduced or minimized. The machine learning model may be trained based on training data indicating a plurality of training interaction entity websites and frequencies of price changes, inventory updates, or listing updates associated with the plurality of interaction entity websites. For example, the training data may include various interaction entity websites that the user or other users visited previously, the pre-defined refresh rates and the time of the refresh. The machine learning model may be trained based on the training websites to make the predicted fresh rates falling within a determined range of the pre-defined refresh ranges (e.g., the accuracy of prediction is within 90%). The trained machine learning model may use interaction entity information related to the first website and the second website as input. For example, interaction entity information related to the first website or the second website may be extracted from live browser data including the interaction entity category code, the type of products offered on the website, and so on. Based on the output from the trained machine learning model, data sharing server may determine the corresponding refresh rates for the first website and the second website.

At step 460, data sharing server may cause the user device to display an alert indicating the update on the determined one or more similar products to the user device. For example, if an update on the first product is detected, data sharing server may cause the first website to display the update on the first product via the first open browser tab. If an update on the second product is detected, data sharing server may cause the second website to display the update on the second product via the second open browser tab. Alternatively and/or additionally, data sharing server may cause an overlay window to display the update on the first product or the second product on the user device. If data sharing server receives an offer from an interaction entity other than the owners of the first website and second website, the offer may be presented in the overlay window.

Figure 5A:
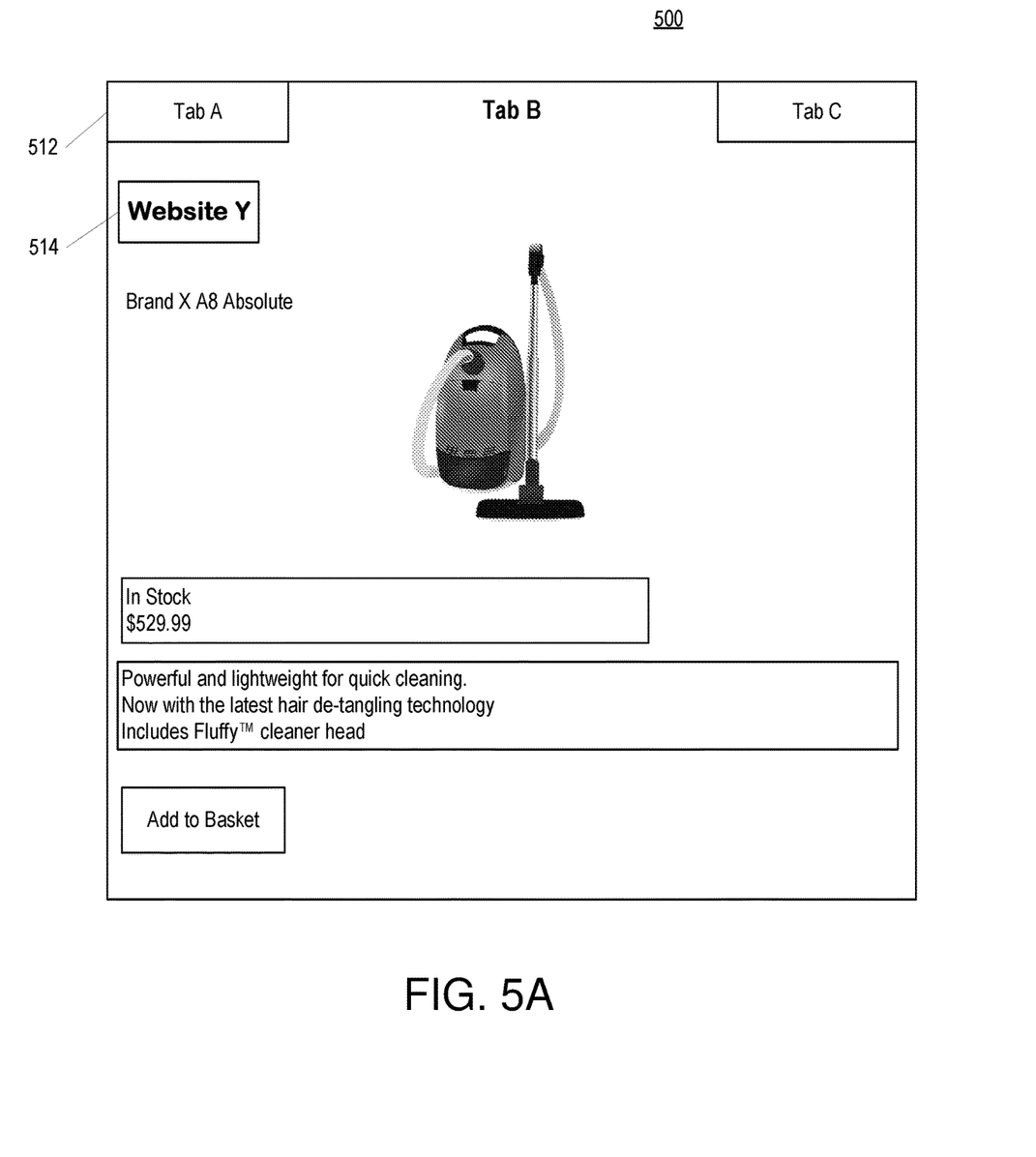
FIG. 5A shows a user interface displaying open browser tabs according to one or more aspects of the disclosure.
Figure 5B:
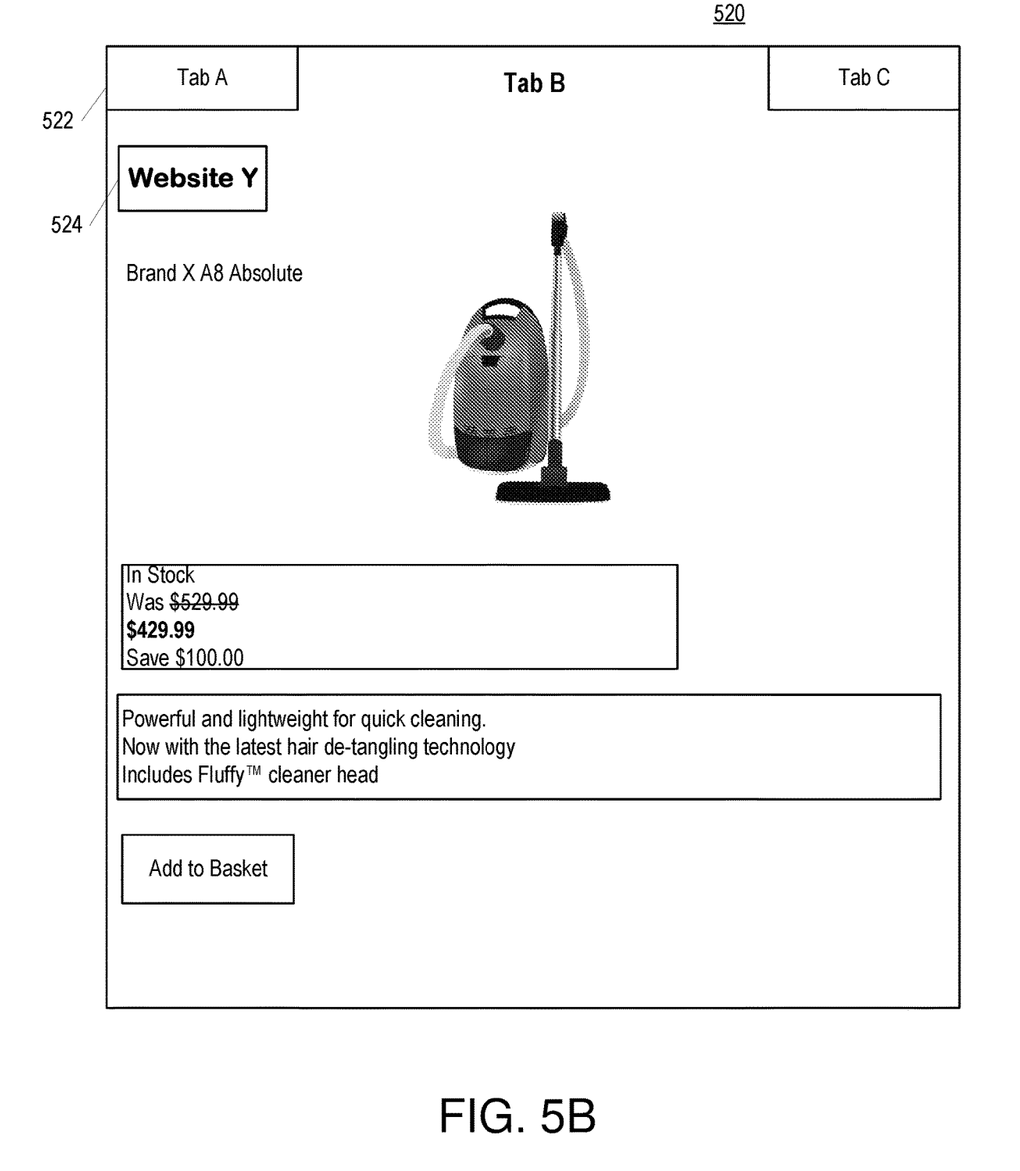
FIG. 5B shows another user interface displaying open browser tabs according to one or more aspects of the disclosure.
Figure 5C:
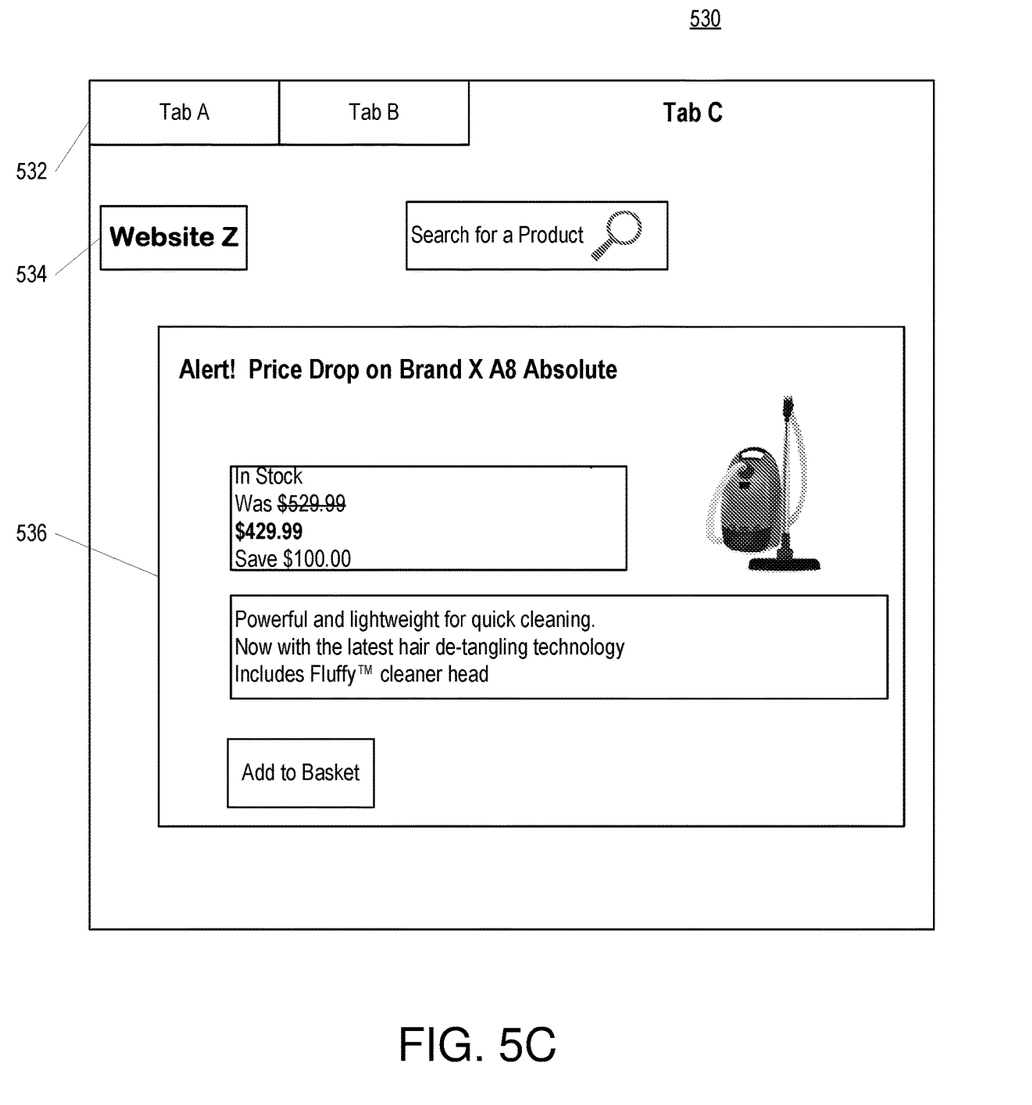
FIG. 5C shows an overlay window displayed via an open browser tab according to one or more aspects of the disclosure.

FIG. 5A-C illustrate examples user interfaces for displaying open browser tabs according to one or more aspects of the disclosure. The elements in FIGS. 5A-C may be representations of various steps in the method 400 depicted in FIG. 4, such as those depicted with respect to steps 410, 450 through 460 of the method 400. As illustrated in FIG. 5A, the user device may execute three open browser tabs 512 including Tabs A, B and C in user interface 510. An open browser Tab B may be active at this particular time, and a website related to interaction entity 514 Website Y may be displayed via Tab B. the Website Y may display a product "Brand X A8 Absolute," an image of the product, a status "in stock" and a price of the product $529.99. The Website Y website also displays product descriptions such as "powerful and lightweight for quick cleaning. Now with the latest hair de-tangling technology. Includes Fluffy cleaner head." The Website Y website further provides an option for the user to add the product to a basket for purchase. The Website Y website may correspond to the first website or the second website as discussed in FIG. 4. The Website Y website as shown in FIG. 5A may illustrate the situation that the user navigates to this website in open browser Tab B, the user switches back and forth among Tabs A, B and C, and the user browses various products on the websites via these open browser tabs. The user may navigate away from the Website Y website without making a purchase.

FIG. 5B shows another user interface display open browser tabs according to one or more aspects of the disclosure. As illustrated in FIG. 5B, data sharing server may periodically refresh the Website Y website. Upon detecting an update on the Website Y website, data sharing server may activate browser Tab B in user interface 520 and display the update on the Website Y website via Tab B. For example, the update on the price may be display as "was $529.99" with the original price crossed out and a new price "$429.99, save 100" displayed on the Website Y website.

FIG. 5C shows an overlay window displayed via an open browser tab according to one or more aspects of the disclosure. Instead of activating Tab B as shown in FIG. 5B, where the previous Website Y website may have been displayed, data sharing server may use an overlay window to display the update in a different website (e.g., Website Z). For example, there are three open browser tabs 532 on the user device. The user may open Tab C in user interface 530 and search a product in a website 534 (e.g., Website Z) in the active browser Tab C. While the user is browsing via Tab C, an overlay window 536 may be displayed in Tab C so that the Website Z website may be partially or entirely (not shown in FIG. 5C) concealed from the user device. The overlay window may generate an alert "Alert! Price Drop on Brand X A8 Absolute" and display the reduced price of $429.99. In some examples, the Brand X A8 Absolute may be provided by a website (e.g., Website Z) different from the previous website (e.g., Website Y). For example, the user may browse a product in the Website Y website, and the product may be displayed as $529.99 on the Website Y website. If the data sharing server determines that the product is available on Website Z website with a lower price, the overlay window may generate an alert "Alert! Brand X A8 Absolute is available on Website Z with a lower price" and display the reduced price of $429.99 (not shown in FIG. 5C). The overlay window may also include a button for the user to add the product to the basket for purchase.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like, that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
  detecting, using a browser extension on a user device associated with a user, that the user navigates to a first website displayed in a first open browser tab and a second website displayed in a second open browser tab;
  receiving, from the browser extension, live browser information associated with the first open browser tab and the second open browser tab that remain open for a predetermined period of time;
  providing, as input to a first machine learning model, the live browser information;
  determining, based on feedback from the first machine learning model, one or more similar products displayed in the first website and the second website;
  detecting an update on the determined one or more similar products associated with the first website in the first open browser tab, wherein the update comprises a posting of a new listing associated with the determined one or more similar products in the first open browser tab; and
  causing the user device to display an alert indicating the update on the determined one or more similar products.

2. The computer-implemented method of claim 1, further comprising:
executing a background process to periodically refresh the first website displaying the determined one or more similar products.

3. The computer-implemented method of claim 1, wherein the update on the determined one or more similar products further comprises:
a removal of an existing listing associated with the determined one or more similar products.

4. The computer-implemented method of claim 1, wherein the first machine learning model has been trained to recognize product similarity based on training data comprising:
image embeddings from a plurality of training interaction entity websites,
text embeddings from the plurality of training interaction entity websites, and
pre-labeled similar products from the plurality of training interaction entity websites; and
wherein the computer-implemented method further comprises:
receiving, as output from the trained first machine learning model and based on the live browser information, the determined one or more similar products displayed in the first website and the second website.

5. The computer-implemented method of claim 1, further comprising:
prior to receiving the live browser information associated with the first open browser tab and the second open browser tab, using a second machine learning model to determine that the first website and the second website are interaction entity websites based on second training data, wherein the second training data comprises information on logos, images, repetitive text, a number of images on a particular website, and a layout of the particular website.

6. The computer-implemented method of claim 1, further comprising:
after determining the one or more similar products displayed in the first website and the second website, detecting that the user navigates away from the first website without making a purchase; and
sending, to an interaction entity computing device, price information associated with the determined one or more similar products displayed in the first website.

7. The computer-implemented method of claim 6, further comprising:
determining, using a third machine learning model, a suggested bid price range to induce the user to purchase the determined one or more similar products; and
presenting, to the interaction entity computing device, the suggested bid price range.

8. The computer-implemented method of claim 1, wherein causing the user device to display the alert indicating the update comprises:
causing, on the user device, the first website to display the update on the determined one or more similar products in the first open browser tab.

9. The computer-implemented method of claim 1, wherein causing the user device to display the alert indicating the update comprises:
causing, on the user device, an overlay window to display the update on the determined one or more similar products.

10. The computer-implemented method of claim 1, further comprising:
using a fourth machine learning model to determine a refresh rate to periodically refresh the first website that displays the one or more similar products, wherein the fourth machine learning model is trained based on training data indicating a plurality of interaction entity websites and frequencies of price changes associated with the plurality of interaction entity websites.

11. An electronic data sharing system comprising:
one or more processors; and
memory storing instructions that, when executed by the one or more processors, cause the electronic data sharing system to:
detect, using a browser extension on a user device associated with a user, that the user navigates to a first website displayed in a first open browser tab and a second website displayed in a second open browser tab;
receive, from the browser extension, live browser information associated with the first open browser tab and the second open browser tab that remain open for a predetermined period of time;
provide, as input to a first machine learning model, the live browser information;
determine, based on feedback from the first machine learning model, one or more similar products displayed in the first website and the second website;
execute a background process to periodically refresh the first website displaying the determined one or more similar products;
detect an update on the determined one or more similar products associated with the first website in the first open browser tab, wherein the update comprises a posting of a new listing associated with the determined one or more similar products in the first open browser tab; and
cause the user device to display an alert indicating the update on the determined one or more similar products.

12. The electronic data sharing system of claim 11, wherein the update on the determined one or more similar products further comprises:
a removal of an existing listing associated with the determined one or more similar products.

13. The electronic data sharing system of claim 11, wherein the first machine learning model has been trained to recognize product similarity based on training data comprising:
image embeddings from a plurality of training interaction entity websites,
text embeddings from the plurality of training interaction entity websites, and
pre-labelled similar products from the plurality of training interaction entity websites; and
wherein the instructions cause the electronic data sharing system to:
receive, as output from the trained first machine learning model and based on the live browser information, the determined one or more similar products displayed in the first website and the second website.

14. The electronic data sharing system of claim 11, wherein the instructions cause the electronic data sharing system to:
prior to receiving the live browser information associated with the first open browser tab and the second open browser tab, use a second machine learning model to determine that the first website and the second website are interaction entity websites based on second training data, wherein the second training data comprises information on logos, images, repetitive text, a number of images on a particular website, and a layout of the particular website.

15. The electronic data sharing system of claim 11, wherein the instructions cause the electronic data sharing system to:
   after determining the one or more similar products displayed in the first website and the second website, detect that the user navigates away from the first website without making a purchase; and
   send, to an interaction entity computing device, price information associated with the determined one or more similar products displayed in the first website.

16. The electronic data sharing system of claim 15, wherein the instructions cause the electronic data sharing system to:
   determine, based on the price information and using a third machine learning model, a suggested bid price range to induce the user to purchase the determined one or more similar products; and
   present, to the interaction entity computing device, the suggested bid price range.

17. The electronic data sharing system of claim 11, wherein the instructions cause the electronic data sharing system to:
   using a fourth machine learning model to determine a refresh rate to periodically refresh the first website that displays the one or more similar products, wherein the fourth machine learning model is trained based on training data indicating a plurality of interaction entity websites and frequencies of price changes associated with the plurality of interaction entity websites.

18. One or more non-transitory media storing instructions that, when executed by one or more processors, cause the one or more processors to perform steps comprising:
   detecting, using a browser extension on a user device associated with a user, that the user navigates to a first website displayed in a first open browser tab and a second website displayed in a second open browser tab;
   receiving, from the browser extension, live browser information associated with the first open browser tab and the second open browser tab that remain open for a predetermined period of time;
   providing, as input to a first machine learning model, the live browser information;
   determining, based on feedback from the first machine learning model, one or more similar products displayed in the first website and the second website;
   using a second machine learning model to determine a refresh rate to periodically refresh the first website that displays the one or more similar products, wherein the second machine learning model is trained based on training data indicating a plurality of interaction entity websites and frequencies of price changes associated with the plurality of interaction entity websites;
   execute, based on the refresh rate, a background process to periodically refresh the first website displaying the determined one or more similar products;
   detecting an update on the determined one or more similar products associated with the first website in the first open browser tab, wherein the update comprises a posting of a new listing associated with the determined one or more similar products in the first open browser tab; and
   cause the user device to display an alert indicating the update on the determined one or more similar products.

19. The non-transitory media of claim 18, wherein the first machine learning model has been trained to recognize product similarity based on training data comprising:
   image embeddings from a plurality of training interaction entity websites,
   text embeddings from the plurality of training interaction entity websites, and
   pre-labeled similar products from the plurality of training interaction entity websites; and
   wherein the instructions, when executed by one or more processors, cause the one or more processors to further perform steps comprising:
   receiving, as output from the trained first machine learning model and based on the live browser information, the determined one or more similar products displayed in the first website and the second website.

20. The non-transitory media of claim 18, wherein the instructions when executed by the one or more processors, cause the one or more processors to further perform steps comprising:
   prior to receiving the live browser information associated with the first open browser tab and the second open browser tab, using a third machine learning model to determine that the first website and the second website are interaction entity websites based on second training data, wherein the second training data comprises information on logos, images, repetitive text, a number of images on a particular website, and a layout of the particular website.

* * * * *